(12) United States Patent
Doshi

(10) Patent No.: US 9,221,975 B2
(45) Date of Patent: *Dec. 29, 2015

(54) TRANSPARENT THERMOPLASTIC CONTAINER

(71) Applicant: E I DU PONT DE NEMOURS AND COMPANY, Wilmington, DE (US)

(72) Inventor: Shailesh Ratilal Doshi, Kingston (CA)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/098,592

(22) Filed: Dec. 6, 2013

(65) Prior Publication Data

US 2014/0170354 A1 Jun. 19, 2014

Related U.S. Application Data

(60) Provisional application No. 61/736,648, filed on Dec. 13, 2012.

(51) Int. Cl.
*C08L 77/06* (2006.01)
*C08K 3/34* (2006.01)
*C08G 69/26* (2006.01)

(52) U.S. Cl.
CPC ............... *C08L 77/06* (2013.01); *C08G 69/265* (2013.01); *C08K 3/34* (2013.01); *C08K 3/346* (2013.01); *C08L 2205/02* (2013.01); *Y10T 428/1397* (2015.01)

(58) Field of Classification Search
CPC ..... C08L 77/06; C08L 2205/02; C08K 3/346; C08K 3/34; C08G 69/26; C08G 69/265; Y10T 428/1397
USPC .......................... 428/36.92, 35.7, 34/1, 474.4
See application file for complete search history.

(56) References Cited

U.S. PATENT DOCUMENTS

| | | | |
|---|---|---|---|
| 5,213,860 A | 5/1993 | Laing | |
| 5,891,987 A | 4/1999 | Yuo et al. | |
| 6,022,613 A * | 2/2000 | Ren | 428/220 |
| 6,407,182 B1 | 6/2002 | Maul et al. | |
| 6,656,589 B2 | 12/2003 | Ogo et al. | |
| 6,943,231 B2 | 9/2005 | Buhler | |
| 7,133,209 B2 | 11/2006 | Wursche et al. | |
| 2011/0105697 A1 * | 5/2011 | Buhler et al. | 525/432 |
| 2014/0170355 A1 * | 6/2014 | Doshi | 428/36.92 |

OTHER PUBLICATIONS

Japanese Abstract JP04239531, Mitsui Petrochemical Industries, Aug. 1992.

* cited by examiner

*Primary Examiner* — Yan Lan

(57) ABSTRACT

Disclosed is a transparent thermoplastic container including a thermoplastic composition including: A) a polyamide resin including
a) 10 to 40 mol % of a first repeat unit of formula (I),

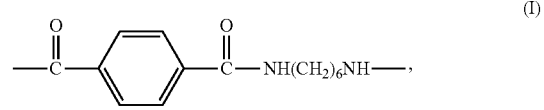

and
b) 60 to 90 mol % of a second repeat unit selected from the group consisting of formula (II)

$$—C(O)(CH_2)_nC(O)NH(CH_2)_6NH— \quad (II);$$

wherein n is an integer selected from 8; and the mol % of repeat units are based on the total repeat units present in the copolyamide; and, optionally, B) an aliphatic homopolyamide having one repeat unit selected from the group of formula (II) and C) a functional additive.

8 Claims, No Drawings

TRANSPARENT THERMOPLASTIC CONTAINER

CROSS REFERENCE TO RELATED APPLICATION

This application claims priority to U.S. Provisional Application No. 61/736,648, filed Dec. 13, 2012.

FIELD OF INVENTION

The present invention relates to transparent thermoplastic containers including semi-aromatic copolyamides capable of steam sterilization.

BACKGROUND OF INVENTION

Many medical test procedures and packaging applications require containers capable of steam sterilization, are transparent and have good oxygen and moisture barrier properties. Often a single thermoplastic polymer is not able to provide all of these characteristics. For example, EVOH is a superior oxygen barrier, but cannot withstand steam sterilization conditions and has poor moisture barrier properties. Cyclic olefin copolymers (COCs) provide transpareny and good moisture barrier, but do not have good oxygen barrier properties, have only limited tolerance to steam sterilization, and have poor resistance to non-polar solvents. Amorphous polyamides such as Selar® PA amorphous nylon barrier resin and Trogamid® transparent polyamides provide good oxygen barrier or transparency, or both, but cannot withstand steam sterilization conditions. Similarly amorphous polymers such as polycarbonate and polystyrenes provide transparency, but lack oxygen barrier properties, and are prone to environmental stress cracking in contact with variety of chemicals.

One way to achieve desired combination of properties is to use a multi-layer structure wherein one layer material is selected to provide moisture barrier, another to provide O2 barrier and/or withstand steam sterilization conditions. However, these require complex manufacturing processes and increase the cost of the containers.

It would be desirable to have a single thermoplastic composition that provides an acceptable combination of oxygen barrier, moisture barrier properties and transparency and can withstand steam sterilization.

U.S. Pat. No. 5,213,860 discloses a plastic ampule comprising a tubular body made of a non-toxic chemically inert thermoplastic material.

U.S. Pat. No. 6,022,613, U.S. Pat. No. 6,407,182, U.S. Pat. No. 6,943,231, U.S. Pat. No. 7,133,209 and US Patent Publication 2011/0105697 disclose a variety of transparent molding compositions.

SUMMARY OF THE INVENTION

Disclosed is a transparent thermoplastic container comprising a thermoplastic composition consisting essentially of:
A) 60 to 100 weight percent of a polyamide resin consisting essentially of
a) 10 to 40 mol % of a first repeat unit of formula (I),

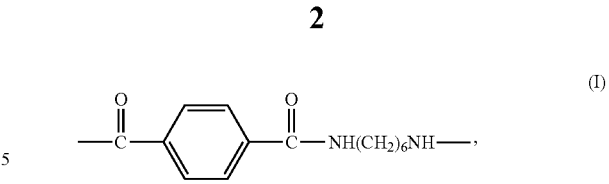

and
b) 60 to 90 mol % of a second repeat unit selected from the group consisting of formula (II)

$-C(O)(CH_2)_nC(O)NH(CH_2)_6NH-$ (II);

wherein n is an integer selected from 8; and the mol % of repeat units are based on the total repeat units present in the copolyamide;
B) 0 to 30 weight percent of an aliphatic homopolyamide having one repeat unit selected from the group of formula (II) and
C) 0 to 10 weight percent of a functional additive;
wherein the weight per cents of A), B) and C) are based on the total weight of the thermoplastic composition.

DETAILS OF THE INVENTION

The polyamide resins useful in making the transparent thermoplastic containers have two or more diamide molecular repeat units. The copolymers are identified by their respective repeat units. The following list exemplifies the abbreviations used to identify monomers and repeat units in the homopolymer and copolymer polyamides (PA) disclosed herein:

HMD 1,6-hexamethylene diamine (or 6 when used in combination with a diacid)
AA Adipic acid
T Terephthalic acid
DDA Decanedioic acid
66 polymer repeat unit formed from HMD and AA
610 polymer repeat unit formed from HMD and DDA
6T polymer repeat unit formed from HMD and T.

Note that in the art the term "6" when used alone designates a polymer repeat unit formed from ϵ-caprolactam. Alternatively "6" when used in combination with a diacid such as adipic acid, for instance 66, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

Copolymer repeat units are separated by a slash (that is, /). For instance poly(hexamethylene decanediamide/hexamethylene terephthalamide) is abbreviated PA610/6T (80/20), and the values in brackets are the mole % repeat unit of each repeat unit in the copolymer.

In one embodiment the thermoplastic container of the invention comprises a thermoplastic composition consisting essentially of: A) 60 to 100 weight percent of a polyamide resin consisting essentially of a) 10 to 40 mol %, and preferably 15 to 30 mol %, and 18 to 28 mol %, of a first repeat unit of formula (I)

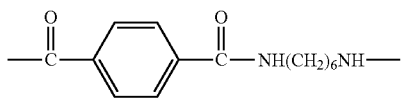

and b) 60 to 90 mol %, and preferably 70 to 85 mol % and 72 to 82 mol % of a second repeat unit selected from formula (II)

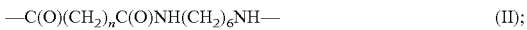

wherein n is an integer selected from 8; and the mol % of repeat units are based on the total repeat units present in the copolyamide. Mol percents are based on the total amount of repeat units in the polyamide. Preferably Component A) polyamide resin is present at 70 to 100 weight percent.

The term "consisting essentially of" with regard to the polyamide resin means the embodiment necessarily includes the listed repeat units and is open to unlisted repeat units that do not materially affect the basic and novel properties of the invention.

The term "consisting essentially of" as applied to the thermoplastic composition means the thermoplastic composition includes the polyamide resin, optional components B) and C), and additional unnamed components in small amounts, so long as the additional unnamed components do not materially affect the basic and novel properties of the invention. The basic properties of the thermoplastic containers disclosed herein include transparency, as assessed by % haze/mm thickness of thermoplastic composition of the container. The lower % haze/mm, the more visible contained matter inside the container will be to a human observer. The visibility may aid, for example, in assessing fluid level, color, turbidity, appearance, and separation of components of the contained matter. One embodiment of transparent thermoplastic containers is that wherein 0.4 mm thick test sheets, as made from said thermoplastic composition, have a % haze/mm, as determined according to ASTM D1003 and normalized to 1 mm thickness, of less than 40%/mm, and preferably less than 20%/mm, and most preferably less than 10%/mm.

Another basic property of the thermoplastic containers includes a transparency, after conditioning in water maintained at saturated vapor pressure at 121° C. This conditioning method may be used to assess the stability of the transparency of the thermoplastic container under sterilization conditions. Many conventional transparent polyamides are not sufficiently resistant to sterilization conditions. For instance, Selar® amorphous nylon barrier resin (PA 6I6T) exhibits severe blistering under sterilization conditions. One embodiment of the transparent thermoplastic container is that wherein 0.4 mm thick test sheets prepared from said thermoplastic composition, conditioned in water maintained at saturated vapor pressure at 121° C. in a sealed autoclave for 20 minutes and allowed to cool to 23° C., have a % haze/mm, as determined according to ASTM D1003 and normalized to 1 mm thickness, of less than 70%/mm, and preferably less than 50%/mm, and most preferably less than 30%/mm.

Another basic property of the thermoplastic containers of this invention includes the oxygen transmission rate (OTR) or permeability of oxygen across the wall of a container made of the thermoplastic composition. One embodiment of transparent thermoplastic containers is wherein 0.4 mm thick test sheets prepared from said thermoplastic composition of the containers, have an oxygen transmission rate, as determined with ASTM D3985 test procedure at 23° C. and 50% relative humidity of 5.0 $cm^3 \cdot mm/m^2$-day-atm or less.

The polyamide resin useful in for preparing the containers can be made by methods well known in the art for making polyamides, see for instance U.S. Pat. Nos. 5,891,987 and 6,656,589, and Japanese Patent Application 04239531, and the disclosure within the Materials Section.

In one embodiment the thermoplastic composition includes 5 to 30 weight percent, and preferably 10 to 30 weight percent of an aliphatic homopolyamide having one repeat unit selected from the group of formula (II).

In one embodiment the thermoplastic composition includes other substances normally found in thermoplastic compositions such as dyes, stabilizers, antioxidants, nucleating agents, polymeric tougheners, plasticizers, lubricants and mold release agents, so long as the substances do not interfere with attaining the basic properties of the thermoplastic composition as defined above.

In one embodiment the thermoplastic composition includes 0.02 to 10.0 weight percent, and preferably 0.1 to 2 and 0.1 to 1.0 weight percent, of a nucleating agent. Nucleating agents are used in semi-crystalline thermoplastic compositions to increase the rate of crystallization of the melt. Any conventionally used nucleating agent for polyamide may be used. Thus, a nucleating agent may be organic such as a polymer having a melt point higher than that of the thermoplastic composition or it may be an inorganic material such as talc, molybdenum disulfide or alkali or alkaline earth metal halide such as LiF, $CaF_2$, and $ZnCl_2$. Bruggolen® P22 nucleating agent is an example of a commercially available polyamide nucleant that is a mixture of organic and inorganic nucleating agents. Nucleating agent needs to be finely divided such that it does not adversely affect the transparency property of the polyamide. By finely divided it is meant that the median particle size of the nucleant is less than 2 microns, and preferably less than 1 micron.

In one embodiment the nucleating agent is talc and preferably the talc is present at 0.1 to 1.0 weight percent, and more preferably 0.1 to 0.6 weight percent, in the thermoplastic composition.

In one embodiment the thermoplastic composition includes a lubricant selected from the group consisting of: stearyl erucamide, N,Ni-ethylene bisstearamide, oxidized polyethylene wax, sodium and calcium salts of montanic acid, aluminum distearate, pentaerythritol tetrastearate, polyethylene glycol 400 di-2-ethylhexoate. If present, preferably the lubricant is present at 0.05 to 0.3 weight percent.

In one embodiment the thermoplastic composition includes an anti-oxidant. Anti-oxidant may be an organic anti-oxidant or an inorganic anti-oxidant. Organic anti-oxidants include hindered phenols, secondary aromatic amines, polyhydric alcohols, phosphites and hypo-phosphites. Inorganic anti-oxidants include combinations of transition metal halides such as copper halide with an alkali metal salt such as potassium halide.

In one embodiment the thermoplastic containers comprise the thermoplastic composition wherein component C), said functional additive, is absent. That is, the thermoplastic composition consists of components A) and, optionally, B); and no other components are present.

In another embodiment the thermoplastic composition consists of components A), optionally B), and a lubricant; and no other components are present.

In another embodiment the thermoplastic containers comprise the thermoplastic composition wherein the thermoplastic composition consists of components A), optionally B), nucleating agent and a lubricant; and no other components are present.

These thermoplastic compositions may be made by conventional means such as melt mixing in a single or twin screw extruder. Containers may be formed by any method usually used for thermoplastics, such as injection molding, extrusion blow molding, and injection blow molding, compression molding, thermoforming, and rotational molding. Additionally containers may be fabricated from sheets and films of the thermoplastic composition.

The containers have an average wall thickness of 0.05 to 2.0 mm and preferably 0.1 to 1.0 mm, more preferably 0.1 to 0.5 mm. Specific container embodiments include those selected from the group consisting of a vial, bottle, sealable bag, pouch, clam-shell package, box, drum liner, tube, and reservoir.

Materials

Talc refers to Talcron MP 1250 available from Specialty Minerals Inc, Barretts, Mont.

PA 610 refers to Zytel® RS3090 polyamide 610 made from 1,6-diaminohexane and 1,10-decanedioic acid having a melting point of 224° C., available from E.I. DuPont de Nemours and Company, Wilmington, Del., USA.

PA 612 refers to Zytel® 158 NC010 resin, having a melting point of about 218° C., available from E. I. du Pont de Nemours and Company, Wilmington, Del.

PA 1010 refers to Zytel® FE110004 polyamide 1010 made from 1,10-decanedioic acid and 1,10-daiminodecane available from E.I. DuPont de Nemours and Company, Wilmington, Del., USA.

PA6I/6T refers to Selar® PA 3426 polyamide available from E.I. DuPont de Nemours and Company, Wilmington, Del., USA.

Preparations of Polyamides

PA612/6T copolyamides with 20, 25, 30 and 35 mole % PA6T units, PA610/6T copolyamides with 20, 25 and 30 mole % PA6T units and PA66/6T copolyamides with 20 and 25 mole % PA6T units were prepared in autoclaves as follows. Two sizes of autoclaves were employed, a small autoclave with 5 kg nominal capacity and a large autoclave with 50 kg nominal capacity. PA612 based copolyamides were prepared in both autoclaves, PA610 based copolyamides were made in the smaller autoclave and PA66 based copolyamides were prepared in the larger autoclave.

The procedure for making PA 610/6T 80/20 copolyamide in the smaller autoclave was as follows.

Salt Preparation: The autoclave was charged with DDA (2027.5 g), terephthalic acid (416.3 g), an aqueous solution containing 80.5 weight percent of HMDA (1832.7 g), an aqueous solution containing 1 weight percent sodium hypophosphite (34.5 g), an aqueous solution containing 28 weight percent acetic acid (51.7 g), an aqueous solution containing 1 weight percent Carbowax 8000 (10.3 g), and water (2223.5 g).

Process Conditions: The autoclave agitator was set to 5 rpm and the contents were purged with nitrogen at 69 kPa (10 psi) for 10 min. The agitator was set to 50 rpm, the pressure control valve was set to 1.72 MPa (250 psi), and the autoclave was heated to 275° C. The pressure reached 1.72 MPa within 45 min and was held there for another 90 min until the temperature of the clave had reached 245° C. The pressure was then reduced to 0 Pa over about 60 min. During this time, the temperature of the clave rose to 260° C. The autoclave pressure was reduced to 34.5 kPa (absolute) (5 psia) by applying vacuum and held there for 15 min. The autoclave was then pressurized with 480 kPa (70 psi) nitrogen and the molten polymer was cast from the autoclave. The collected polymer strands were quenched with cold water and pelletized.

The copolyamide obtained had an inherent viscosity (IV) of 1.06 dl/g; in this case, IV was measured on a 0.5% solution in m-cresol at 25° C.

For making other PA610 based copolyamide compositions, the quantities of DDA and terephthalic acid were adjusted to achieve the desired molar ratios. Similarly for making PA 612 based copolyamide, DDDA was used instead of DDA, and quantities of this acid and terephthalic acid were adjusted to achieve the desired molar ratios.

The procedure for making PA 612/6T copolyamides in the larger autoclave was as follows.

One hundred one kg (222 lbs.) of a 45 percent by weight of polyamide salt solution was prepared from HMDA, DDDA, and water, where the molar ratio of DDDA to T was adjusted to correspond to target PA6T content in the final polymer of 20, 25, 30 or 35 mole % 6T. The solution was charged into an autoclave with 3.4 g of a 10 percent by weight solution of a conventional antifoam agent in water, 0.7 g of sodium hypophosphite, between 146 to 322 g of 100% HMDA, and between 103 to 237 g of glacial acetic acid to get to the target pH of the salt solution of 8.1+/−0.1. The solution was then heated while the pressure was allowed to rise to 1.72 MPa (250 psi) at which point steam was vented to maintain the pressure at 1.72 MPa and heating was continued until the temperature of the batch reached 240° C. The pressure was then reduced slowly to reach in the range of 28-55 kPa (absolute) (4-8 psia), while the batch temperature was allowed to further rise to 265-275° C. The pressure was then held around 41 kPa (absolute) (6 psia) and the temperature was held at 265-275° C. for about 20 min. Finally, the polymer melt was extruded into strands, cooled, and cut into pellets. The copolyamides had an IV in the range of 0.87 to 1.02.

Methods

Preparation of Sheets

The following polyamide resins were used to prepare extruded sheets:
(a) Polyamide 610;
(b) Polyamide 610/6T with a repeat unit molar ratio of 80:20;
(c) Polyamide 612/6T with a repeat unit molar ratio of 75:25.

Sheet extrusion was carried out using a 32 mm (1¼") single screw extruder with 30:1 length:diameter ratio, screw with a Saxton mixer and 4 zone barrel heating. The extruder was fitted with a 200 mm (8") coat hanger die to extrude a sheet. The take up system consisted of a set of casting rolls comprising a rubber roll and a heated polished chrome roll and a set of haul-off rolls.

Sheets at two thicknesses of nominally 0.38 mm (15 mils) and 0.76 mm (30 mils) were made by setting the die gap at 0.5 mm and 0.9 mm respectively and the nip spacing at the requisite sheet thickness. Extruder barrels, die adapter and die were heated to a temperature profile of 215 to 230° C. The heated chrome casting roll was set at a temperature of about 38° C. (100° F.). The extruder screw RPM was 35 and casting roll speed was 0.9 m/min (3 ft/min). A sheet with lay-flat width of nominally 17.5 cm (7") was thus produced.

Test sheets measuring 10 cm×10 cm (4"×4") were cut from extruded sheets to provide samples for oxygen transmission and transparency measurements.

Oxygen Transmission Method

Oxygen transmission measurements were carried out using MOCON OX-TRAN 2/21 Module 6 test equipment per ASTM D3985—Standard Test Method for Oxygen Gas Transmission Rate Through Plastic Film and Sheeting Using a Coulometric Sensor. The measurements were carried out 23° C./50% RH on nominally 0.38 mm (15 mil) thickness samples.

Transparency Evaluation—% Haze Determination

To characterize transparency, haze in the samples was determined per ASTM D1003—Standard Test Method for Haze and Luminous Transmittance of Transparent Plastics test procedure using BYK-Gardner Hazegard Plus equipment. Measured % haze was normalized to 1 mm thickness so as to enable comparison of test samples with different thicknesses. A value of equal to or greater than 100% haze/mm indicates that the sample scatters all of incident light intensity, and is thus essentially opaque.

Steam Sterilization Method

Test sheets of each material were subjected to a conditioning cycle in an autoclave. Samples were immersed in water in the autoclave filled with water. The autoclave was dosed, and heated up to 121° C. allowing internal pressure to rise to about 2 bars. Upon reaching the desired temperature, samples were conditioned for 20 minutes. The autoclave was then allowed to cool to 23° C. and any residual pressure was released to open the autoclave. The % haze of conditioned samples was measured per ASTM D1003 as disclosed above.

ABBREVIATIONS mm=millimeter
m=meter
d=day
cm=centimeter
OTR=oxygen transmission rate
RH=relative humidity
RPM=revolutions per minute Examples 1-4 and Comparative Examples C1 and C2

Extruded sheets of the thermoplastic compositions listed in Table 1 were made according to the directions in the Methods Section. The thicknesses of the "as made" sheets, and the % haze and OTR values for the sheets are listed in Table 1. Examples 1-4 including PA 610/6T (80/20) exhibited improved transparency, that is, lower % haze/mm than Comparative examples C1 and C2 consisting of PA 610.

Additionally, Examples 1-4, after 121° C. water immersion for 20 minutes in an autoclave, exhibited significantly higher transparency, that is, lower % haze/mm than Comparative examples C1 and C2.

TABLE 1

| Example | 1 | 2 | 3 | 4 | C-1 | C-2 |
|---|---|---|---|---|---|---|
| Composition | | | | | | |
| PA 610/6I (80/20) | 100 | 100 | 99.5 | 75 | | |
| PA 610 | | | | 24.5 | 100 | 100 |
| Talc | | | 0.5 | 0.5 | | |
| Sheets, as made | | | | | | |
| thickness (mm) | 0.44 | 0.76 | 0.45 | 0.38 | 0.31 | 0.76 |
| Haze (%) | 2.3 | 4.8 | 7.8 | 12.3 | 16.7 | 33.5 |
| Haze (%)/mm | 5.2 | 6.3 | 16.9 | 32.3 | 55.1 | 44.0 |
| OTR @ 23 C./50% RH (cm3 · mm/m2-d-atm) | 2.4 | | | | 4.4 | |
| Sheets, after 121° C. water immersion | | | | | | |
| Haze (%) | 10.1 | 18.6 | 13.3 | 23.9 | 45.7 | 54.0 |
| Haze (%)/mm | 22.9 | 24.5 | 29.9 | 62.1 | 150 | 70.9 |

TABLE 1-continued

| Example | 1 | 2 | 3 | 4 | C-1 | C-2 |
|---|---|---|---|---|---|---|
| OTR @ 23 C./50% RH (cm³ · mm/m²-d-atm) | n/a | | 1.3 | 1.4 | n/a | |

Examples 3 and 4 show favorable OTR @ 23 C/50% RH values as compared to many commercial polyamides listed in Table 2.

TABLE 2

Commercial Polyamides Oxygen Permeation Rates

| Material | PA 610 | PA1010 | PA6I/6T | PA11 | PA6 |
|---|---|---|---|---|---|
| Sheet thickness (mm) | 0.31 | n/a | n/a | n/a | n/a |
| OTR @ 23 C./50% RH (cm³ · mm/m²-d-atm) | 4.4 | 8.8 | 0.5* | 20* | 2.6* |

*literature reported values

I claim:

1. A transparent thermoplastic container comprising a thermoplastic composition consisting essentially of:
   A) 60 to 100 weight percent of a polyamide resin consisting essentially of
      a) 10 to 40 mol % of a first repeat unit of formula (I),

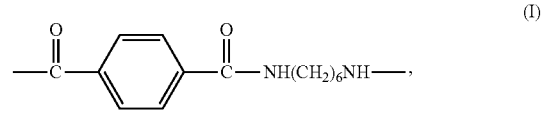

and
   b) 60 to 90 mol % of a second repeat unit selected from the group consisting of formula (II)

wherein n is an integer selected from 8; the mol % of repeat units are based on the total repeat units present in the polyamide resin;
   B) 0 to 30 weight percent of an aliphatic homopolyamide having one repeat unit selected from the group of formula (II) and
   C) 0 to 10 weight percent of a functional additive;
   wherein the weight per cents of A), B) and C) are based on the total weight of the thermoplastic composition.

2. The transparent thermoplastic container of claim 1 wherein 0.4 mm thick test sheets prepared from said thermoplastic composition, conditioned in water maintained at saturated vapor pressure at 121° C. in a sealed autoclave for 20 minutes and allowed to cool to 23° C., have a % haze/mm, as determined according to ASTM D1003 and normalized to 1 mm thickness, of less than 70%/mm.

3. The transparent thermoplastic container of claim 1 wherein 0.4 mm thick test sheets prepared from said thermoplastic composition, have an oxygen transmission rate, as determined with ASTM D3985 test procedure at 23 C/50% relative humidity of 5.0 cm³·mm/m²-day-atm or less.

4. The transparent thermoplastic container of claim 1 wherein B) said aliphatic homopolyamide is present at 5 to 30 weight percent.

5. The transparent thermoplastic container of claim 1 wherein C) said functional additive is a nucleating agent and is present 0.1 to 2.0 weight percent.

6. The transparent thermoplastic container of claim 5 wherein said nucleating agent is talc.

7. The transparent thermoplastic container of claim 1 wherein C) said functional additive is absent.

8. The transparent thermoplastic container of claim 1 having an average wall thickness of 0.05 to 2.0 mm.

\* \* \* \* \*